United States Patent [19]

Gazeley

[11] Patent Number: 4,955,707
[45] Date of Patent: Sep. 11, 1990

[54] PIVOTING OPTICAL ACCESSORY FOR USE WITH SPECTACLES

[75] Inventor: Albert E. Gazeley, San Po Kong, Hong Kong

[73] Assignee: Polaroid Corporation, Cambridge, Mass.

[21] Appl. No.: 842,640

[22] Filed: Mar. 21, 1986

[51] Int. Cl.⁵ .............................................. G02C 9/00
[52] U.S. Cl. ......................................... 351/47; 351/57
[58] Field of Search ...................... 351/47, 48, 57, 59

[56] References Cited

U.S. PATENT DOCUMENTS

| | | | |
|---|---|---|---|
| 3,183,523 | 5/1965 | Harrison | 2/13 |
| 3,238,005 | 3/1966 | Petitto | 351/59 |
| 3,413,057 | 11/1968 | Carmichael | 351/47 |
| 3,531,188 | 9/1970 | Leblanc et al. | 351/48 |
| 3,555,563 | 1/1971 | Grossman | 2/14 |
| 3,575,497 | 4/1971 | Leblanc | 351/47 |
| 3,741,634 | 6/1973 | Stoltze | 351/57 |
| 4,176,921 | 12/1979 | Matthias | 351/106 |

FOREIGN PATENT DOCUMENTS 1097716 7/1961 Fed. Rep. of Germany .
1408195 7/1965 France .

Primary Examiner—Paul M. Dzierzynski
Attorney, Agent, or Firm—Leslie J. Payne; Edward S. Roman

[57] ABSTRACT

There is disclosed an improved optical accessory of the sun shade type for use with a pair of prescription spectacles. The accessory includes releasable securing structure which releasably cooperates with a bridge assembly of the spectacles to inhibit movement of the accessory relative thereto and further includes structure which permits pivoting of the accessory's sun shades.

16 Claims, 2 Drawing Sheets

PIVOTING OPTICAL ACCESSORY FOR USE WITH SPECTACLES

BACKGROUND OF THE INVENTION

Optical accessories for use in combination with spectacles exist for a wide variety of reasons. Sunglass type accessories, for instance, generally permit optimum use of the spectacles under varying lighting conditions. Other optical accessories provide, for example, eye shielding and vision correcting functions.

A number of factors are considered important in constructing such accessories. In this regard, it is desirable to have the optical elements of the accessory positioned in correct superposed relationship to the optical members of spectacles for proper usage and convenience. In many instances, it is highly desirable to avoid unnecessary movement of the accessory relative to the spectacle frame assembly. Moreover, facilitating quick, easy and reliable mounting and demounting of the accessory are of practical importance. Significantly, it is desirable to have these mounting arrangements as aesthetic as possible. Unaesthetic mounting arrangements, of course, detract appreciably from the commercial appeal of such accessories. Furthermore, in the highly competitive spectacle accessory field, need exists to provide the foregoing features as simply, economically and efficiently as possible.

One particular kind of optical accessory is the flip-type. It allows the user to selectively flip the shades up or down relative to the spectacle lenses. Flip-type accessories are popular for a wide variety of reasons including, of course, versatility insofar as one can quickly and easily choose whether sun shading functions are desired or not.

Mounting arrangements for releasably attaching optical accessories to spectacle frames are significant components of the accessories as well as, of course, the manner by which the shades are pivoted. In this latter regard it is highly desirable to obtain the pivoting motion without disrupting the stability of the accessory. The following are exemplary of prior art optical accessories and their releasable mounting arrangements: 3,413,057; 3,555,563; 3,741,634, and 4,176,921.

Known optical accessories exhibit a number of deficiencies in connection with the foregoing enumerated factors. For example, most accessories must have specially constructed frames to be attached to. Hence, such accessories are not compatible with many kinds of existing prescription glass frames.

SUMMARY OF THE INVENTION

It is an object of the present invention to provide an improved optical accessory for use in combination with spectacles.

In this regard, the optical accessory is for use with spectacles of the type having a pair of optical elements and means for bridging and holding the optical elements in spaced apart relationship. Such means has surfaces intermediate the optical elements which are cooperable in a releasable way with the accessory. The accessory includes a pair of optical members such as sun shades and means for connecting the optical members in spaced apart relationship so that each is adapted to be in superposed relation with a respective one of the optical elements of the spectacles. An arrangement is provided for releasably attaching the accessory to the cooperable surfaces of the spectacles in such a way as to secure the accessory in a correct position and permit ease in flipping the sun shades.

The accessory comprises means for yieldably biasing the accessory to a spectacle frame opening so as to provide a releasable connection therewith. Such connection prevents substantial movement of the accessory in all directions in a plane defined by the opening and limits movement in directions generally transverse to the plane, when the accessory is attached.

The means for connecting the optical members is pivotably attached to the yieldable biasing means. In one position the connecting means is releasably secured, whereby the sun shades are in juxtaposed relationship to the optical elements and in a second position have been pivoted so that they do not obstruct the spectacle's optical elements. The pivoting can be accomplished without disrupting the accessory's stability.

Among the other objects of the invention are therefore the provision of an improved optical accessory for use in combination with spectacles wherein the accessory is easily attached and detached therefrom; the provision of an improved optical accessory which is easily and accurately positioned and securely mounted to inhibit undesired relative movement of the accessory with respect to the spectacles; the provision of an optical accessory having an improved mounting arrangement which permits pivoting of the accessory's optical members without disrupting the stability of the accessory in the mounted condition.

Other objects and further scope of applicability of the present invention will become apparent from the detailed description to follow when taken in conjunction with the accompanying drawings in which like parts are designated by the reference numerals.

DETAILED DESCRIPTION

Figure 1:
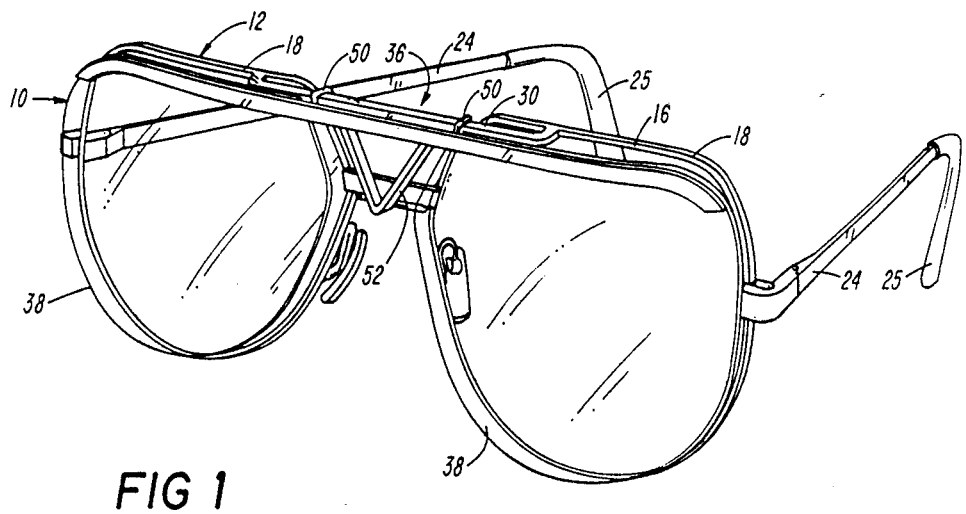
FIG. 1 is a perspective view of the improved optical accessory of the present invention shown in combination with a pair of spectacles.
Figure 2:
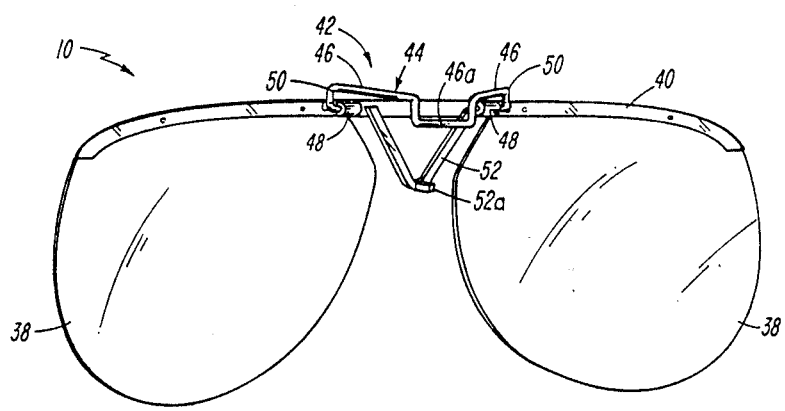
FIG. 2 is a perspective rear view better showing structure of the accessory.

Reference is now made to the drawings for showing the improved optical accessory 10 of the present invention. It is contemplated for use with a pair of spectacles 12, such as of the type shown in FIG. 1. In this embodiment, the optical accessory 10 can be of the sun shade type.

As illustrated, the spectacles 12 can be of the prescription glasses type and include prescription lenses 14 which are secured to a frame assembly 16. Other optical elements could, of course, be used instead. In particular, the frame assembly 16 (FIGS. 1 and 3) is a conventional wire-framed type and includes a pair of lens frames 18. These lens frames 18 are spaced apart and connected by a central bridging assembly 20. Attached as by temple hinges and lugs, generally indicated at 22, to outward lateral sides of the lens frames 18 are conventional temple pieces 24 which have ear tips 25 engageable with the ears of a wearer. Attached to inward lateral sides of the lens frame 18 is a pair of conventional opposing nose pads 26.

Figure 5:
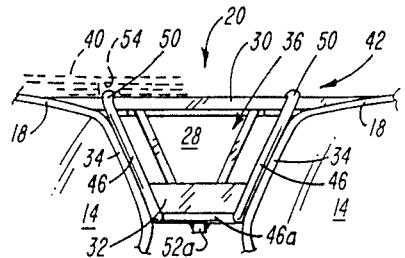
FIG. 5 is a fragmented rear view better showing the stable releasable cooperation between the accessory and the spectacles.

Reference is again made to the central bridging assembly 20 which in the present embodiment includes a central opening 28, in part, defined by a brow bar and nose bridge 30 and 32; respectively, which are generally horizontally extending and spaced apart from each other, such as best shown in FIG. 5. Also defining the central opening 28 are generally vertically slanting portions 34 of the lens frames 18 which converge from the brow bar to the nose bridge 30, 32; respectively. The brow bar 30, nose bridge 32 and the slanting portions 34 define accessory cooperating structure or assembly 36. The brow bar 30 is arranged to extend forwardly in bridging relationship, from one lens frame 18 to the other. In this connection, see FIGS. 1 and 3.

Reference is now made to FIGS. 1-5 for showing the optical accessory 10. Included in the optical accessory 10 is a pair of spaced apart and adjacent sun shade type optical elements 38 made of any suitable material. The optical elements 38 are held in a horizontally spaced apart orientation by a connecting bar 40. The connecting bar 40 is an elongated and resilient metallic piece which through plastic rivets is secured to the optical elements 38.

Releasable attaching and pivoting means 42 is integrally formed with the connecting bar 40. Essentially, the releasable attaching and pivoting means 42 serves to not only releasably and stably secure the accessory 10 to the spectacles 12, but permits the pivoting of the optical elements 38 to either the vertical shading position (FIG. 1) or horizontal non-shading position (FIG. 4).

In this embodiment, the releasable attaching and pivoting means 42 includes a resiliently deformable unitary wire-like clasping member 44. The clasping member 44 is provided with a generally V-shaped configuration having converging portions 46 which merge together and form a rearwardly extending nose bar engaging member or tongue 46a. The tongue 46a is configured to have a snap-fit cooperation with the bottom of the nose bar 32, much as in the manner indicated in FIGS. 1 and 5. The clasping member 44 has its end portions pivotally supported by pivot assemblier 48. In the normal mode of operation, the clasping member 44 is in the restraining position when it is in engagement with the accessory cooperating structure 36 shown best in FIGS. 1, 3 and 5. The clasping member 44 is made of a flexible and resilient metal. The converging portions 46 are sized and configured to tightly engage the slant portions 34 when the accessory 10 is attached to the noted cooperating structure 36 (FIG. 5). As a consequence of such engagement, the accessory 10 is inhibited from lateral movement. The present invention also contemplates that the converging portions 46 can in response to contact with slant portions 34 bow resiliently inwardly slightly, thereby creating a reaction force which tends to exert pressure outwardly against the slant portions. The nose bar tongue 46a is constructed to have a snap-fit with the bottom of the nose bar 32. In this regard, the nose bar tongue 46a resiliently deforms upon engaging the nose bar 32 for creating the snap-fit connection. The clasping member 44 has hook-like portions 50 which rest upon the top surface of the brow bar 30 when the accessory 10 is latched to the spectacles 12. As a result of the above, movement of the accessory 10 in a vertical direction is limited. Due to the foregoing structural arrangement, the accessory 10 is stably mounted in such a manner as to inhibit its horizontal, vertical and rotational movement in a plane defined by the opening 28. In this fashion the optical accessory 10 is securely positioned with respect to the spectacles 12.

Suspended from the connecting bar 40 is a generally V-shaped finger engageable tab portion 52. This tab portion 52 allows a user to flip the accessory between shading and non-shading positions. The tab portion 52, in the illustrated embodiment, has a tongue 52a which has a releasable frictional engagement with the bottom of the nose bar tongue 46a. This allows the sun shades 38 to be releasably retained in their overlying relationship with respect to the lenses 14. In another preferred embodiment, the tab 52 need not have such a tongue.

Figure 3:
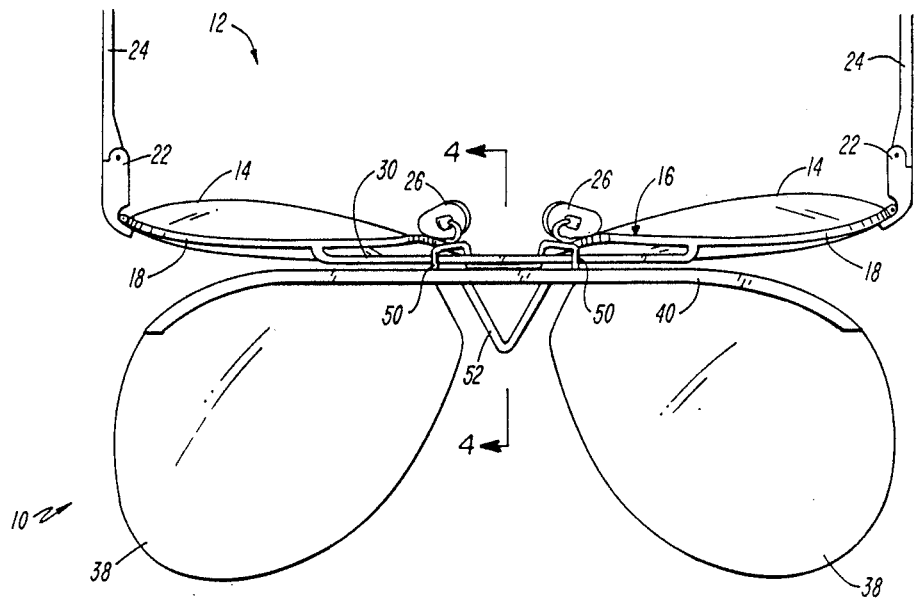
FIG. 3 is a plan view of the accessory and the spectacles with the former in a pivoted upward position.
Figure 4:
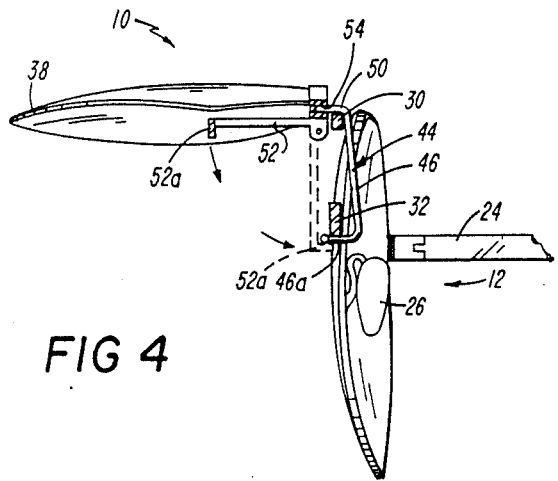
FIG. 4 is a cross-sectional view taken along section line 4—4 appearing in FIG. 3 and looking in the direction of the arrows.

For flipping or pivoting the optical elements 38 to the horizontal or raised positions shown in FIGS. 3 and 4, the tab 52 is lifted, thereby overcoming its engagement with the nose bar tongue 46a. Movement of the accessory 10 to the horizontal position is limited when the connecting bar 40 with its recesses 54 rest on the hook portions 50.

Because of the restraining effects brought about by the releasable attaching means, the noted flipping action of the optical accessory 10 can be achieved without disrupting the stability of the accessory 10.

Since certain changes may be made in the above-described accessory without departing from the scope of the invention herein involved, it is intended that all matter contained in the description or shown in the accompanying drawings shall be interpreted as illustrative and not in a limiting sense.

What is claimed is:

1. An optical accessory for use in combination with spectacles of the type including a pair of optical elements and means for holding the elements in spaced apart relationship and for defining accessory cooperating structure intermediate the elements, said intermediate structure including brow bar, nose bridge and side segments, said accessory comprising: a pair of optical members, means for connecting said members in space apart relationship, means for releasably attaching said accessory to the cooperating structure such that when said accessory is attached to the cooperating structure, movement of said accessory in substantially all directions in a generally vertical plane defined by the structure is inhibited, said accessory including top, bottom and side portions, said top and bottom portions yieldably engage the top of the brow bar and the bottom of the nose bridge, respectively, which inhibits up and down movement of said accessory, said side portions engage corresponding ones of the side segments which inhibits side-to-side movement of said accessory and means for pivotally mounting said releasably attaching means to said connecting means such that when said attaching means is attached to the structure said optical members can be pivoted between raised and lowered positions relative to the optical elements.

2. An optical accessory for use in combination with spectacles of the type including a pair of optical elements, and means for holding the optical elements in spaced apart relationship and for defining a structure intermediate the optical elements said intermediate structure including brow bar, nose bridge and side segments; said accessory comprising a pair of optical members; means for connecting said optical members in spaced apart relationship, means for having a snap-fit releasable connection with the intermediate structure and for substantially limiting movement of said accessory in all directions in a generally vertical plane defined by the intermediate structure, said accessory including top, bottom and side portions, said top and bottom portions yieldably engage the top of the brow bar and the bottom of the nose bridge, respectively, which inhibits up and down movement of said accessory, said side portions engage corresponding ones of the side segments which inhibits side-to-side movement of said accessory and means for pivotally attaching said releasably snap-fit means to said connecting means, when said releasable snap-fit means is connected to the intermediate structure, said optical members can be pivoted between raised and lowered positions without any movement of said snap-fit means.

3. The invention of claim 2 further including means for releasably securing said optical members in the lowered position.

4. The invention of claim 3 wherein said releasable securing means includes a member which has a releasable engagement with said snap-fit means to thereby releasably secure said optical members in the lowered position.

5. A sunshade device for use with prescription glasses, the prescription glasses comprising a pair of lenses, a pair of lens frames each mounting one of the lenses, a brow bar and a nose bridge, the brow bar and nose bridge serving to space the lenses apart and cooperating with a section of each of the lens frames, said sunshade device including:
   a pair of sunshades;
   means for connecting said the pair of sunshades together in spaced apart orientation;
   means for releasably attaching said sunshades device to the prescription glasses with said pair of sunshades positioned over respective ones of the lenses, said attaching means including a wire-like member having a hook portion which extends over the brow bar and a retaining portion being resiliently deformable so as to have a releasable snap-fit with the nose bridge for attaching said sunshade device to the glasses, said wire-like member having frame engaging portions which engage the sections of each of the lens frames, said attaching means inhibiting movement of said device in all directions in a generally vertical plane defined by the sections of the frames; and
   means for pivotally mounting said attaching means to said connecting means for allowing said sunshades to be pivoted between raised and lowered positions.

6. The invention of claim 5 further including means for releasably securing said sunshades in the lowered position.

7. The invention of claim 6 wherein said releasable securing means includes a resiliently deformable member which has a releasably secure engagement with said retaining portion when said sun shades are in the lowered position.

8. A sunshade device for use with prescription glasses, the prescription glasses comprising a pair of lenses, a pair of lens frames each mounting one of the lenses, a brow bar and a nose bridge, the brow bar and nose bridge serving to space the lenses apart, said lens frames respectively having sections extending between the nose bridge and brow bar to present upwardly diverging facing surfaces, said sunshade device including:
   a pair of sunshades;
   means for connecting said pair of sunshades together in spaced apart orientation; said connecting means including means for releasably holding said sunshades in overlying relationship with the lens frames, and
   means for releasably attaching said sunshade device to the prescription glasses, said attaching means including:
   a generally V-shaped wire-like member having a portion bent to form a tongue, a pair of hook-like terminal portions and a pair of intermediate sections which extend between its said tongue and said terminal portions in an outwardly diverging manner, said hook-like terminal portions configured to loop over the brow bar of the glasses and said tongue serving to effect a releasable snap-fit connection under the nose bridge of the glasses and at such times said intermediate sections of said wire-like member being arranged to respectively engage and exert outwardly directed pressure against the upwardly diverging facing surfaces of the lens frames, said hook-like terminal portions, said tongue and said intermediate sections of said wire-like member serving to substantially preclude movement of said wire-like member relative to the prescription glasses in any direction, and
   means for pivotally connecting said terminal portions of said wire-like member to said sunshade connecting means to facilitate, when said sunshade device is releasably attached to the prescription glasses, the selective movement of said sunshades between a first position wherein they are located out of operative relationship with respect to the lenses and a second position wherein they are respectively located in overlying operative relationship to the lenses
   said releasable holding means releasably frictionally engaging said tongue when said attaching means is attached to the prescription glasses.

9. An optical accessory in combination with spectacles;
   said spectacles including a pair of optical elements and means for holding said elements in spaced apart relationship and for defining accessory cooperating structure intermediate said elements said intermediate structure including brow bar, nose bridge and side segments;
   said accessory comprising a pair of optical members; means for connecting said members in spaced apart relationship; means for releasably attaching said accessory to said cooperating structure such that when said accessory is attached to said cooperating structure, movement of said accessory in substantially all directions in a generally vertical plane defined by said structure is limited; said accessory including top, bottom and side portions, said top and bottom portions yieldably engage the top of the brow bar and the bottom of the nose bridge, respectively, which inhibits up and down movement of said accessory, said side portions engage corresponding ones of the side segments which inhibits side-to-side movement of said accessory and means for pivotally mounting said releasable attaching means to said connecting means such that when said attaching means is attached to said structure said optical members can be.pivoted between raised and lowered positions.

10. An optical accessory in combination with spectacles;
    said spectacles including a pair of optical elements, and means for holding said optical elements in spaced apart relationship and for defining a structure intermediate said optical elements said intermediate structure including brow bar, nose bridge and side segments;
    said accessory comprising a pair of optical members; means for connecting said optical members in spaced apart relationship; means for having a snap-fit releasable connection with said intermediate structure to substantially limit movement of said accessory in all directions in a generally vertical plane defined by said intermediate structure; said accessory including top, bottom and side portions, said top and bottom portions yieldably engage the top of the brow bar and the bottom of the nose bridge, respectively, which inhibits up and down movement of said accessory, said side portions engage corresponding ones of the side segments which inhibits side-to-side movement of said accessory and means for pivotally attaching said snap-fit means to said connecting means such that when said snap-fit means is connected to said intermediate structure, said optical members can be pivoted between raised and lowered positions without causing movement of said snap-fit means.

11. The invention of claim 10 further including means for releasably securing said optical members in the lowered position.

12. The invention of claim 11 wherein: said releasable securing means includes a member which has a releasable engagement with said snap-fit means to thereby releasably secure said optical members in the lowered position.

13. A sunshade device in combination with prescription glasses;
    said prescription glasses comprising a pair of lenses, a pair of lens frames each mounting one of said lenses, a brow bar and a nose bridge, said brow bar and nose bridge serving to space said lenses apart and cooperating with a section of each of said lens frames;
    said sunshade device including:
    a pair of sunshades;
    means for connecting said pair of sunshades together in spaced apart orientation;
    means for releasably attaching said sunshade device to said prescription glasses with said pair of sunshades positioned over respective ones of said lenses; said attaching means including a wire-like member having a hook portion which extends over said brow bar and a retaining portion being resiliently deformable so as to have a releasable snap-fit with said nose bridge for attaching said sunshade device to said glasses, said wire-like member having frame engaging portions which engage said sections of each of said lens frames, said attaching means inhibiting movement of said device in all directions in a generally vertical plane defined by said sections of said frames; and
    means for pivotally mounting said attaching means to said connecting means for allowing said sunshades to be pivoted between raised and lowered positions.

14. The invention of claim 13 further including means for releasably securing said sunshades in the lowered position.

15. The invention of claim 14 wherein: said releasable securing means includes a resiliently deformable member which has a releasably secure engagement with said retaining portion when said sunshades are in the lowered position.

16. A sunshade device in combination with prescription glasses:
    said prescription glasses comprising a pair of lenses; a pair of lens frames each mounting one of said lenses, a brow bar and a nose bridge, said brow bar and nose bridge serving to space said lenses apart, said lens frames respectively having sections extending between said nose bridge and brow bar to present upwardly diverging facing surfaces, said sunshade device including:
    a pair of sunshades;
    means for connecting said pair of sunshades together in spaced apart orientation; said connecting means including means for releasably holding said sunshades in overlying relationship with the lens frames, and
    means for releasably attaching said sunshade device to said prescription glasses, said attaching means including:
    a generally V-shaped wire-like member having a portion bent to form a tongue, a pair of hook-like terminal portions and a pair of intermediate sections which extend between its said tongue and said terminal portions in an outwardly diverging manner, said hook-like terminal portions configured to loop over said brow bar of said glasses and said lip serving to effect a snap-fit connection under said nose bridge of said glasses at such times with said intermediate sections of said wire-like member being arranged to respectively engage and exert outwardly directed pressure against said upwardly diverging facing surfaces of said lens frames, said hook-like terminal portions, said tongue and said intermediate sections of said wire-like member serving to substantially preclude movement of said wire-like member relative to said prescription glasses in any direction, and
    means for pivotally connecting said terminal portions of said wire-like member to said sunshade connecting means to facilitate, when said sunshade device is releasably attached to said prescription glasses, the selective movement of said sunshades between a first position wherein they are located out of operative relationship with respect to said lenses and a second position wherein they are respectively located in overlying operative relationship to said lenses,
    said releasable holding means releasably frictionally engaging said tongue when said attaching means is attached to the prescription glasses.

* * * * *